United States Patent Office 3,056,810
Patented Oct. 2, 1962

3,056,810
3-THIO AND 3-MERCAPTO-TESTOSTERONES
Fred A. Kincl, Mexico City, Mexico, assignor, by mesne assignments, to Syntex Corporation, a corporation of Panama
No Drawing. Filed Oct. 29, 1959, Ser. No. 849,443
Claims priority, application Mexico Oct. 31, 1958
14 Claims. (Cl. 260—397.5)

The present invention relates to certain new cyclopentanophenanthrene derivatives.

More particularly, it relates to the novel 3-thio-testosterones and 3-mercapto-testosterones of the general formula:

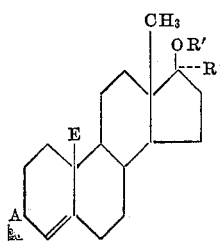

in which A is a member of the group consisting of =S and

E is a member of the group consisting of hydrogen and methyl, R is a member of the group consisting of hydrogen and an alkyl radical having up to 8 carbon atoms, and R' is a member of the group consisting of hydrogen and the acyl radical of a hydrocarbon carboxylic acid having up to about 12 carbon atoms. Such hydrocarbon carboxylic acids are either saturated or unsaturated, of straight, branched, cyclic or mixed cyclic-aliphatic chain, and include those substituted with functional groups such as hydroxyl, acyloxy (1 to 12 carbon atoms), alkoxy (1 to 5 carbon atoms) or halogen (fluorine or chlorine). New 17-esters derived from such carboxylic acids are, among others, the acetates, propionates, butyrates, hemisuccinates, enanthates, caproates, benzoates, trimethylacetates, phenoxyacetates, phenylpropionates and β-chloropropionates.

The new compounds which are the subject of the present invention, exhibit anti-estrogenic and anti-androgenic activity and inhibit the gonadotropine excretion.

Certain steroidal ketones, such as steroidal compounds with keto functions at C-3 react with hydrogen sulfide in the presence of a strong mineral acid to produce the respective thio-compounds, which in turn can be reduced to the corresponding mercapto compounds. In this manner I have prepared the new 3-thio- and 3-mercapto androstanes according to the present invention. This process can be illustrated by the following reaction diagram:

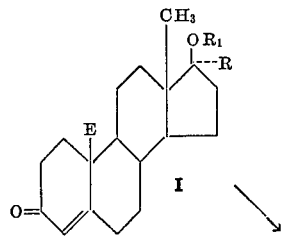

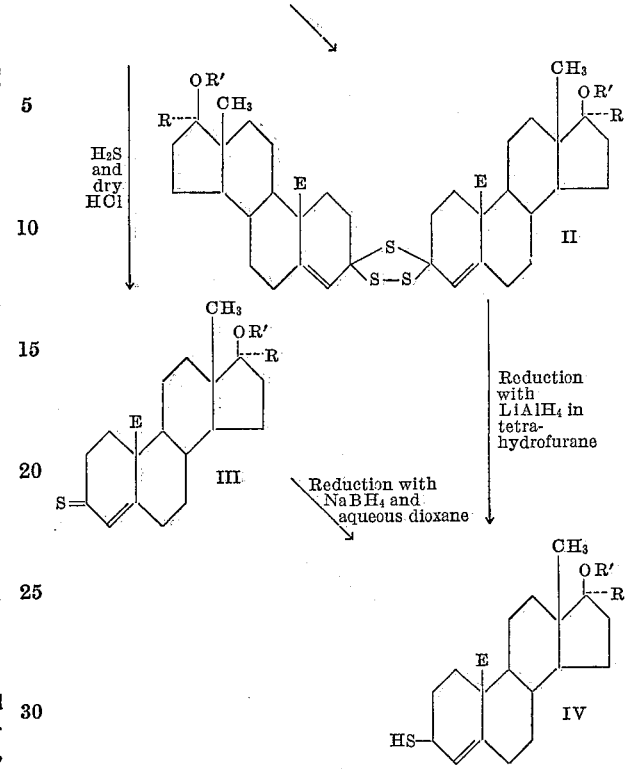

In the above formulas E, R and R' have the meaning as explained above.

For the formation of the thio group at C-3 the starting androstane compound (I) was treated with hydrogen sulfide under anhydrous conditions and in the presence of a mineral acid; preferably a cooled solution of the androstane in ethanol-benzene was treated simultaneously with dry hydrogen chloride and gaseous hydrogen sulfide. As an intermediate product there was isolated the respective 3,3'-thio-3,3'-dithio-steroid of the formula II, that is, a compound wherein two of the respective testosterone residues are joined at C-3 via two sulfur bridges.

By treatment of the resulting 3-thio-compound (III) with a double hydride, such as sodium borohydride in aqueous dioxane solution for example, there was obtained the respective 3-mercapto-compounds (IV).

The byproduct (II) was converted to the final mercapto compound (IV) by treatment with lithium aluminum hydride in tetrahydrofurane.

From a 17-ester of testosterone or of 17α-alkyl-testosterone there were obtained the corresponding esters of 3-thio-testosterone or the 3-thio-17α-alkyl-testosterones; unesterified testosterone yields as final product the unesterified 3-thio and 3-mercapto derivatives which can then be esterified by conventional methods.

The above-described process can be modified within wide limits without altering the final result. For example: in the step of the introduction of the thio group benzene-ethanol can be replaced by another solvent inert to this reaction, such as an aromatic or aliphatic hydrocarbon such as hexane, cyclohexane, tetraline or a polar solvent such as methanol, ethanol, iso-amyl alcohol or benzyl alcohol, or chlorinated solvents such as methylene chloride or chloroform; preferably the reaction is conducted at a temperature a few degrees below 0° C., but it can be varied within relatively wide limits; instead of hydrogen chloride there can be used other hydrogen halides under anhydrous conditions, for example hydrogen bromide, or other mineral acids such as sulfuric acid; for the reduction of the thio group to the mercapto group there can be used other double hydrides, such as, for example, lithium aluminum hydride; furthermore, the thio group can be eliminated, for example, by reaction with Raney nickel.

This invention is further illustrated, but not limited, by the following examples:

Example I

A solution of 1 g. of testosterone in a mixture of 15 cc. of dry benzene and 80 cc. of absolute ethanol was cooled to a temperature between —5 and —10° C.; there was then simultaneously introduced a slow stream of dry hydrogen chloride and a stream of dry hydrogen sulfide, taking care that the temperature of the mixture did not rise over —5° C. The steroid was thus treated for 3 hours and the mixture was allowed to reach room temperature; it was then filtered off from a small amount of insoluble material, consisting mainly of 3,3'-thio-3,3'-dithio-testosterone, the filter was washed with absolute methanol and the combined filtrate and washings were concentrated to a small volume under reduced pressure. Upon cooling to —30° C. there crystallized 3-thio-testosterone which was collected by filtration, dried under vacuum and purified by recrystallization from acetone-hexane.

A solution of 500 mg. of the above compound in 20 cc. of dioxane was treated with a solution of 100 mg. of sodium borohydride in 2 cc. of water and kept at room temperature for 4 hours; the mixture was acidified with acetic acid, diluted with 100 cc. of water and the precipitate was collected, washed with water, dried under vacuum and recrystallized from acetone-hexane. There was thus obtained 3-mercapto-testosterone.

Example II

A mixture of 200 mg. of 3-mercapto-testosterone obtained according to Example I, 5 cc. of pyridine and 5 cc. of acetic anhydride was kept overnight at room temperature, poured into 30 cc. of ice water; the precipitate was collected, washed with water, dried under vacuum and recrystallized from acetone-hexane, thus yielding 3-mercapto-testosterone 3,17-diacetate.

Example III

By applying the method of the previous example to testosterone acetate, the step of the reaction with hydrogen sulfide yielded 3-thio-testosterone 17-acetate; upon subsequent reduction of this compound with sodium borohydride the acetate group was simultaneously hydrolyzed and 3-mercapto-testosterone was obtained which is identical with the product obtained in accordance with Example I.

Example IV

By following the procedure described in Example I, the following new compounds were obtained from the cited starting materials:

| | Starting Material | New Compound |
|---|---|---|
| a | 17α-methyl-testosterone | 17α-methyl-3-thio-testosterone. 17α-methyl-3-mercapto-testosterone. |
| b | 19-nor-testosterone | 3-thio-19-nor-testosterone. 3-mercapto-19-nor-testosterone. |
| c | 17α-ethyl-19-nor-testosterone 17-acetate. | 17α-ethyl-3-thio-19-nor-testosterone 17-acetate. 17α-ethyl-3-mercapto-19-nor-testosterone. |
| d | 17α-propyl-testosterone | 17α-propyl-3-thio-testosterone. 17α-propyl-3-mercapto-testosterone. |

Example V

A solution of 1 g. of 17α-ethyl-3-mercapto-19-nor-testosterone obtained according to the methods of the previous example, in 50 cc. of benzene was treated with 2 g. of cyclopentylpropionic acid anhydride in the presence of 200 mg. of p-toluene sulfonic acid and stirred for 48 hours at room temperature. The mixture was washed with water, dried over anhydrous sodium sulfate and evaporated to dryness.

I claim:

1. A new compound having the general formula:

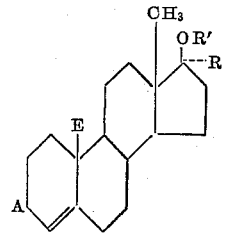

in which A is a member of the group consisting of =S and

E is a member of the group consisting of hydrogen and methyl, R is a member of the group consisting of hydrogen and an alkyl radical having up to 8 carbon atoms, and R' is a member of the group consisting of hydrogen and the acyl radical of a hydrocarbon carboxylic acid having up to about 12 carbon atoms.

2. 3-thio-testosterone.
3. 3β-mercapto-testosterone.
4. 3β-mercapto-testosterone 17-acetate.
5. 3-thio-testosterone 17-acetate.
6. 17α-methyl-3-thio-testosterone.
7. 17α-methyl-3β-mercapto-testosterone.
8. 3-thio-19-nor-testosterone.
9. 3β-mercapto-19-nor-testosterone.
10. 17α-lower alkyl-3-thio-testosterone.
11. 17α-lower alkyl-3β-mercapto-testosterone.
12. 17α-lower alkyl-3-thio-19-nor-testosterone.
13. 17α-lower alkyl-3β-mercapto-19-nor-testosterone.
14. 17α-ethyl - 3β - mercapto-19-nor-testosterone-17-cyclopentylpropionate.

No references cited.